(12) United States Patent
Albakri

(10) Patent No.: US 11,128,156 B2
(45) Date of Patent: Sep. 21, 2021

(54) TRANSFER POWER CHARGER

(71) Applicant: Sadeq Albakri, Brooklyn, NY (US)

(72) Inventor: Sadeq Albakri, Brooklyn, NY (US)

( * ) Notice: Subject to any disclaimer, the term of this patent is extended or adjusted under 35 U.S.C. 154(b) by 36 days.

(21) Appl. No.: 16/822,155

(22) Filed: Mar. 18, 2020

(65) Prior Publication Data
US 2020/0313452 A1 Oct. 1, 2020

Related U.S. Application Data

(60) Provisional application No. 62/826,913, filed on Mar. 29, 2019.

(51) Int. Cl.
*H01M 10/46* (2006.01)
*H02J 7/00* (2006.01)
*H02J 7/02* (2016.01)
*H01R 25/00* (2006.01)
*H02J 50/10* (2016.01)

(52) U.S. Cl.
CPC .......... *H02J 7/0045* (2013.01); *H01R 25/006* (2013.01); *H02J 7/0047* (2013.01); *H02J 7/02* (2013.01); *H02J 50/10* (2016.02)

(58) Field of Classification Search
CPC ...... H02J 7/0045; H02J 7/0042; H02J 7/0044; H02J 7/342; H02J 7/0047; H02J 50/10; H02J 50/005
USPC ................ 320/103, 107, 108, 114, 115, 132, 320/DIG. 18, DIG. 19; 702/63, 64; 340/636.1, 636.12
See application file for complete search history.

(56) References Cited

U.S. PATENT DOCUMENTS

| | | | |
|---|---|---|---|
| 2013/0038279 A1* | 2/2013 | Seyerle | H01F 27/36 320/108 |
| 2013/0285601 A1* | 10/2013 | Sookprasong | H02J 7/02 320/108 |
| 2014/0253025 A1* | 9/2014 | Van Wiemeersch | H02J 50/40 320/108 |
| 2017/0063142 A1* | 3/2017 | Loewen | H02J 7/025 |
| 2017/0338684 A1* | 11/2017 | Mishriki | H04B 5/0037 |
| 2019/0305578 A1* | 10/2019 | Cerasani | H04B 5/0037 |
| 2019/0327364 A1* | 10/2019 | Winston | H02J 7/0047 |
| 2020/0212689 A1* | 7/2020 | Yamamoto | H02J 7/0027 |

* cited by examiner

*Primary Examiner* — Edward Tso
(74) *Attorney, Agent, or Firm* — Bruce A. Lev

(57) ABSTRACT

A transfer power charger structured and arranged to transfer an electric charge from one electronic device to another electronic device via charging ports, USB charging cables, and an inductive charger.

7 Claims, 3 Drawing Sheets

TRANSFER POWER CHARGER

CROSS-REFERENCE TO RELATED APPLICATION

The present application is related to and claims priority from prior provisional application Ser. No. 62/826,913, filed Mar. 29, 2019 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of charging devices and more specifically relates to a transfer power charger for transferring power from one device to another.

2. Description of the Related Art

A battery charger, or recharger, is a device used to put energy into a secondary cell or rechargeable battery by forcing an electric current through it. The charging protocol (how much voltage or current for how long, and what to do when charging is complete, for instance) depends on the size and type of the battery being charged. Some battery types have high tolerance for overcharging (i.e., continued charging after the battery has been fully charged) and can be recharged by connection to a constant voltage source or a constant current source, depending on battery type.

Simple chargers of this type must be manually disconnected at the end of the charge cycle, and some battery types absolutely require, or may use a timer, to cut off charging current at some fixed time, approximately when charging is complete. Other battery types cannot withstand over-charging, being damaged (reduced capacity, reduced lifetime), over heating or even exploding. The charger may have temperature or voltage sensing circuits and a microprocessor controller to safely adjust the charging current and voltage, determine the state of charge, and cut off at the end of charge.

Most mobile phone chargers are not really chargers, only power adapters that provide a power source for the charging circuitry which is almost always contained within the mobile phone. Older ones are notoriously diverse, having a wide variety of DC connector styles and voltages, most of which are not compatible with other manufacturers' phones or even different models of phones from a single manufacturer.

Users of publicly accessible charging kiosks must be able to cross-reference connectors with device brands/models and individual charge parameters and thus ensure delivery of the correct charge for their mobile device. A database-driven system is one solution and is being incorporated into some designs of charging kiosks.

Most modern cell phones, laptops, and most electric vehicles use Lithium-ion batteries. These batteries last longest if the battery is frequently charged; fully discharging the cells will degrade their capacity relatively quickly, but most such batteries are used in equipment which can sense the approach of fill discharge and discontinue equipment use. When stored after charging, lithium battery cells degrade more while fully charged than if they are only 40-50% charged. As with all battery types, degradation also occurs faster at higher temperatures. Degradation in lithium-ion batteries is caused by an increased internal battery resistance often due to cell oxidation. This decreases the efficiency of the battery, resulting in less net current available to be drawn from the battery. However, if Li-ION cells are discharged below a certain voltage a chemical reaction occurs that make them dangerous if recharged, which is why many such batteries in consumer goods now have an "electronic fuse" that permanently disables them if the voltage falls below a set level. The electronic fuse circuitry draws a small amount of current from the battery, which means that if a laptop battery is left for a long time without charging it, and with a very low initial state of charge, the battery may be permanently damaged.

Accordingly, the present invention overcomes the disadvantages associated with the prior art by providing a transfer power charger for transferring power from one device to another by incorporating charging ports, USB charging cables, and a inductive charging panel.

BRIEF SUMMARY OF THE INVENTION

In view of the foregoing disadvantages inherent in the known art, the present invention provides a novel transfer power charger. The general purpose of the present invention, which will be described subsequently in greater detail, is to provide a transfer power charger structured and arranged to transfer a charge from one device, i.e., a smartphone, to another device, i.e., a smartphone device via charging ports, USB charging cables, and an inductive charging panel.

The features of the invention which are believed to be novel are particularly pointed out and distinctly claimed in the concluding portion of the specification. These and other features, aspects, and advantages of the present invention will become better understood with reference to the following drawings and detailed description.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
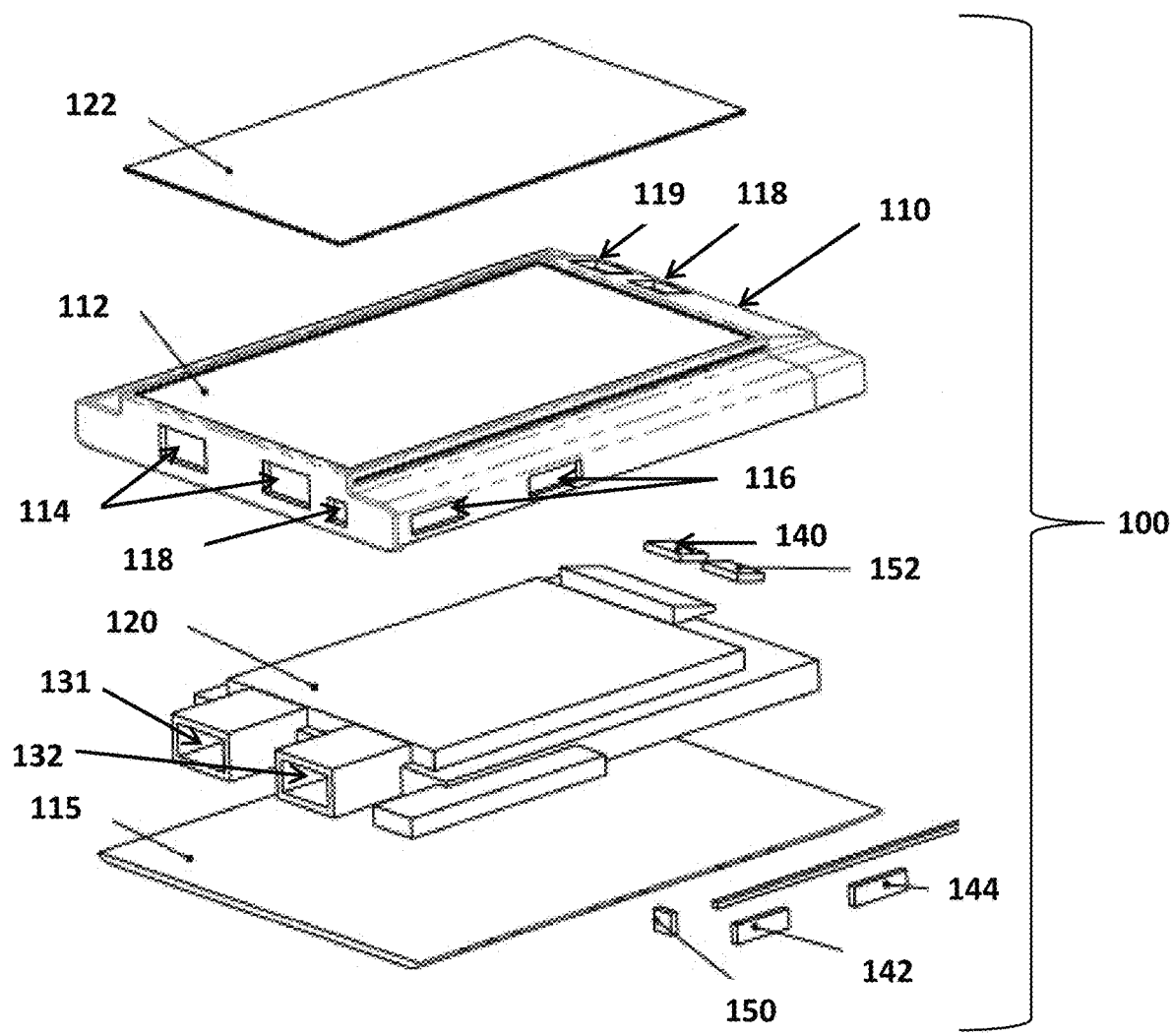
FIG. 1 shows an exploded perspective view illustrating the transfer power charger according to the preferred embodiment of the present invention.
Figure 2:
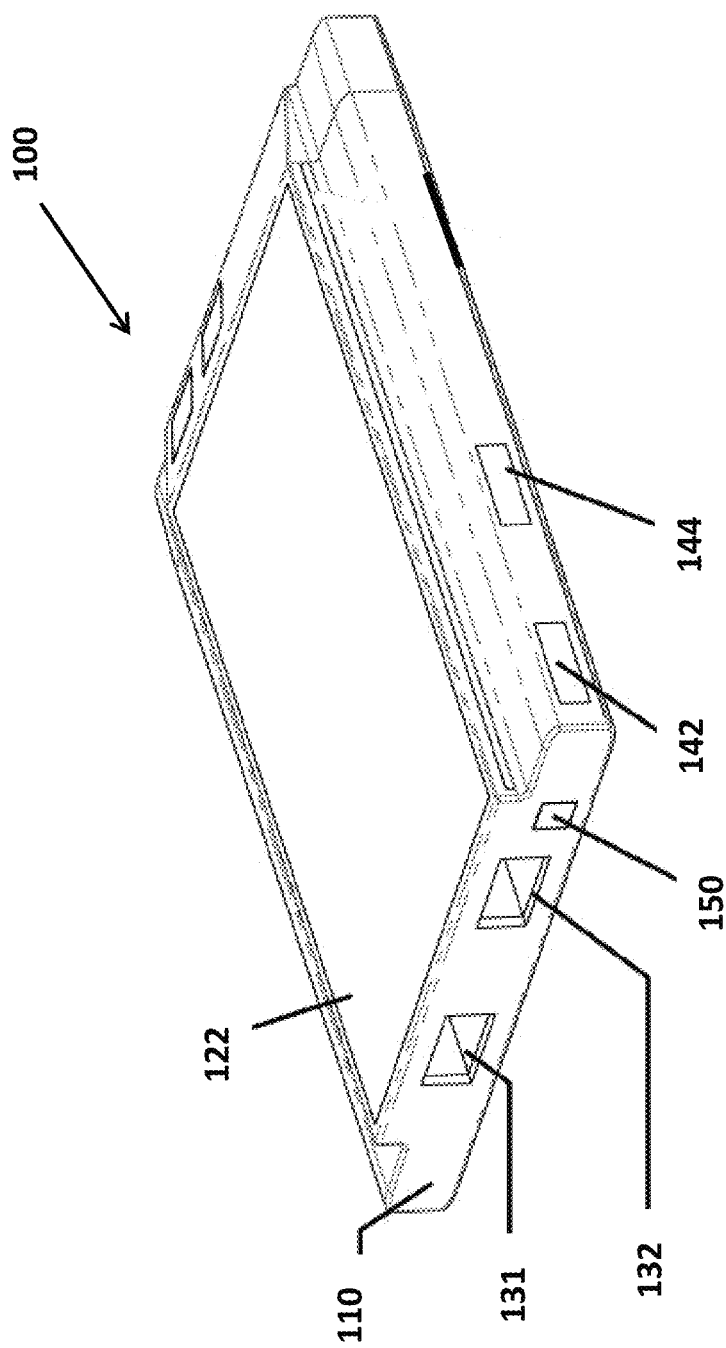
FIG. 2 shows a perspective view illustrating the transfer power charger according to the preferred embodiment of FIG. 1.
Figure 3:
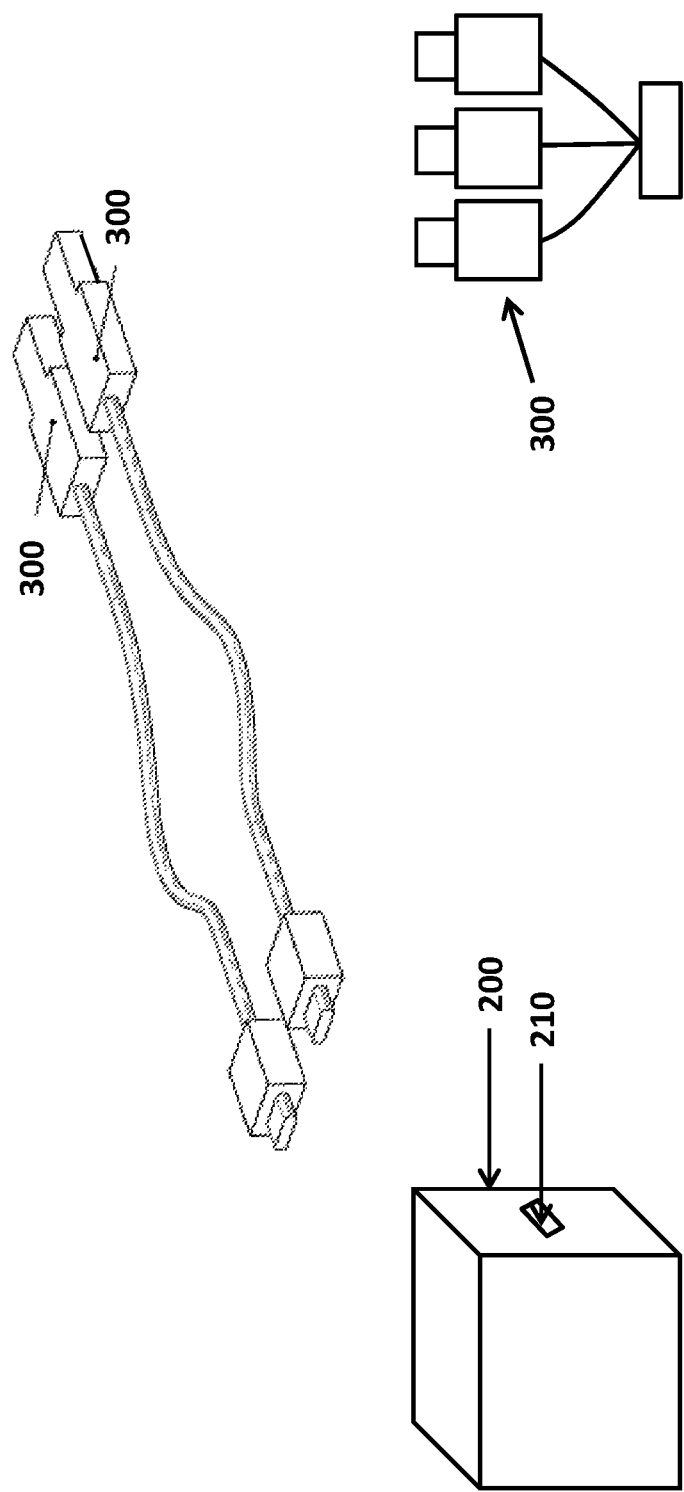
FIG. 3 shows a charging block and USB wires for the transfer power charger according to the preferred embodiment of FIG. 1.

Referring now to the drawings FIG. 1, the transfer power charger 100 is structured and arranged to transfer power from one device, i.e., a smartphone, to another device, i.e., another smartphone device, via charging ports, USB charging cables, and an inductive charging panel. More specifically, the transfer power charger 100 comprises a main body 110 that includes a top surface 112; wherein the top surface 112 is adapted to securely retain an inductive charging panel 122 thereon, at least two spaced USB port openings 114, at least two spaced button openings 116, at least two spaced LED light openings 118, a power button opening 119, and a bottom panel 115, wherein said main body 110 forms a hollow interior volume; a plurality of electrical wires; an inductive charger 120 located within the hollow interior volume of the main body, is adapted to receive electric energy via induction, store electric energy, and transfer electric energy to an external electronic device via induction; an inductive charging panel 122 including an inductive charging surface adapted to allow an electronic device to be placed thereon, wherein the inductive charging panel is adapted to allow electric energy to pass therethrough, wherein the inductive charging panel is adapted to be placed upon the top surface of the main body and be retained thereon, and wherein the inductive charging panel is adapted to allow electric energy to pass between the electronic device and the inductive charger via induction; at least one USB charging port 131 adapted to be connected to the main body adjacent to a respective one of the at least two spaced USB port openings 114, is electronically connected to the inductive charger via at least one of the plurality of electrical wires, and is adapted such that an external power supply can be removably attached thereto via a USB wire and electrically charge the inductive charger; at least one USB device charging port 132 adapted to be connected to the main body adjacent to a respective one of the at least two spaced USB port openings 114, is electronically connected to the inductive charger via at least one of the plurality of electrical wires, and is adapted such that an electrical device can be removably attached thereto via a USB wire and be electrically charged via the inductive charger; a power button 140 connected to the main body adjacent to the power button opening, is electronically connected to the inductive charger via at least one of the plurality of electrical wires, and is adapted to activate or deactivate the inductive charger; a first electrical current direction button 142 connected to the main body adjacent to a first of the at least two spaced button openings, is electronically connected to the inductive charger via at least one of the plurality of electrical wires, and is adapted such that the direction of electrical energy can be chosen between electrical energy flowing from the inductive charger to the USB device charging port and from the USB device charging port to the inductive charger; a second electrical current direction button 144 connected to the main body adjacent to a second one of the at least two spaced button openings, is electronically connected to the inductive charger via at least one of the plurality of electrical wires, and is adapted such that the direction of electrical energy can be chosen between electrical energy flowing from the inductive charger to the inductive charging panel and from the inductive charging panel to the inductive charger; a first LED light 150 connected to the main body adjacent to a first of the at least two spaced LED light openings, is electronically connected to the USB device charging port via at least one of the plurality of electrical wires, and is adapted to light up when the USB device charging port is operative; and a second LED light 152 connected to the main body adjacent to a second of the at least two spaced LED light openings, is electronically connected to the inductive charging panel via at least one of the plurality of electrical wires, and is adapted to light up when the inductive charging panel is operative.

The first LED light 150 is adapted to emit a green color when electric energy is being directed from the inductive charger to the USB device charging port, and is adapted to emit a yellow color when electric energy is being directed from the USB device charging port to the inductive charger. The second LED light 152 is adapted to emit a green color when electric energy is being directed from the inductive charger to the inductive charging panel, and is adapted to emit a yellow color when electric energy is being directed from the inductive charging panel to the inductive charger.

Furthermore, there is a charging block 200 including a charging block USB port 210, wherein the charging block is adapted to releasably and electronically connect with an external power source and transfer electrical energy from the external power source out through the charging block USB port; and at least one USB wire 300 adapted to releasably and electrically connect with the charging block USB port on one end thereof and the at least one USB battery charging port on an opposite end thereof. The at least one USB wire 300 may be formed having multiple connectors on the opposite end each formed having a different shape from one another and adapted to respectively connect with USB ports having different shapes.

The main body 110 may be formed from a material chosen from a group of materials consisting of plastic, ceramic, epoxy, and carbon. And, the inductive charging panel 122 is formed from a material chosen from a group of materials consisting of plastic, ceramic, epoxy, and carbon.

In a preferred embodiment, the inductive charger 120 uses electromagnetic induction to provide electricity and consists of two coils of insulated wire wound around a common iron core. One coil is made from relatively few (tens or hundreds) turns of coarse wire. The other coil typically consists of up to a million turns of fine wire (up to 40 gauge). When an external electronic device is placed near the inductive charger an electromagnetic field is generated between the two objects and electric power moves from one to the other or vice versa.

In practice, an electronic device, i.e., a smart phone, can be placed upon the inductive charging panel 122 and electric power can either be drawn therefrom via the inductive charger 120 and stored by the inductive charger, or sent thereto from the inductive charger to charge the electronic device. Furthermore, electric power can be sent from an external power source into the inductive charger for use charging the electronic device.

In one embodiment of use, one smart phone is connected to the USB charging port 131 and another is placed upon the inductive charging panel 122, such that electric energy is transferred from one smart phone to the other. In other words, one smart phone can recharge another using the instant transfer power charger.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A transfer power charger comprising:
    a main body including:
        a top surface;
            wherein said top surface is adapted to securely retain an inductive charging panel thereon;
        at least two spaced USB port openings;
        at least two spaced button openings;
        at least two spaced LED light openings;
        a power button opening; and
        a bottom panel;
        wherein said main body forms a hollow interior volume;
    a plurality of electrical wires;
    an inductive charger:
        wherein said inductive charger is located within said hollow interior volume of said main body, is adapted to receive electric energy via induction, store electric energy, and transfer electric energy to an external electronic device via induction;
    an inductive charging panel including:
        an inductive charging surface;
            wherein said inductive charging surface is adapted to allow an electronic device to be placed thereon;
        wherein said inductive charging panel is adapted to allow electric energy to pass therethrough;
        wherein said inductive charging panel is adapted to be placed upon said top surface of said main body and be retained thereon; and
        wherein said inductive charging panel is adapted to allow electric energy to pass between said electronic device and said inductive charger via induction;
    at least one USB charging port;
        wherein said at least one USB charging port is adapted to be connected to said main body adjacent to a respective one of said at least two spaced USB port openings, is electronically connected to said inductive charger via at least one of said plurality of electrical wires, and is adapted such that an external power supply can be removably attached thereto via a USB wire and electrically charge said inductive charger;
    at least one USB device charging port;
        wherein said at least one USB device charging port is connected to said main body adjacent to a respective one of said at least two spaced USB port openings, is electronically connected to said inductive charger via at least one of said plurality of electrical wires, and is adapted such that an electrical device can be removably attached thereto via a USB wire and be electrically charged via said inductive charger;
    a power button;
        wherein said power button is connected to said main body adjacent to said power button opening, is electronically connected to said inductive charger via at least one of said plurality of electrical wires, and is adapted to activate or deactivate said inductive charger;
    a first electrical current direction button;
        wherein said first electrical current direction button is connected to said main body adjacent to a first of said at least two spaced button openings, is electronically connected to said inductive charger via at least one of said plurality of electrical wires, and is adapted such that the direction of electrical energy can be chosen between electrical energy flowing from said inductive charger to said USB device charging port and from said USB device charging port to said inductive charger;
    a second electrical current direction button;
        wherein said second electrical current direction button is connected to said main body adjacent to a second one of said at least two spaced button openings, is electronically connected to said inductive charger via at least one of said plurality of electrical wires, and is adapted such that the direction of electrical energy can be chosen between electrical energy flowing from said inductive charger to said inductive charging panel and from said inductive charging panel to said inductive charger;
    a first LED light;
        wherein said first LED light is connected to said main body adjacent to a first of said at least two spaced LED light openings, is electronically connected to said USB device charging port via at least one of said plurality of electrical wires, and is adapted to light up when said USB device charging port is operative; and
    a second LED light;
        wherein said second LED light is connected to said main body adjacent to a second of said at least two spaced LED light openings, is electronically connected to said inductive charging panel via at least one of said plurality of electrical wires, and is adapted to light up when said inductive charging panel is operative.

2. The improved circuit breaker system of claim 1, wherein said first LED light is adapted to emit a green color when electric energy is being directed from said inductive charger to said USB device charging port; and wherein said first LED light is adapted to emit a yellow color when electric energy is being directed from said USB device charging port to said inductive charger.

3. The improved circuit breaker system of claim 1, wherein said second LED light is adapted to emit a green color when electric energy is being directed from said inductive charger to said inductive charging panel; and wherein said second LED light is adapted to emit a yellow color when electric energy is being directed from said inductive charging panel to said inductive charger.

4. The improved circuit breaker system of claim 1, further comprising:

a charging block including:

a charging block USB port;

wherein said charging block is adapted to releasably and electronically connect with an external power source and transfer electrical energy from said external power source out through said charging block USB port; and at least one USB wire;

wherein said at least one USB wire is adapted to releasably and electrically connect with said charging block USB port on one end thereof and said at least one USB charging port on an opposite end thereof.

5. The improved circuit breaker system of claim 4, wherein one of said at least one USB wire is formed having multiple connectors on said opposite end; and wherein said multiple connectors are each formed having a different shape from one another adapted to respectively connect with USB ports having different shapes.

6. The improved circuit breaker system of claim 1, wherein said main body is formed from a material chosen from a group of materials consisting of plastic, ceramic, epoxy, and carbon.

7. The improved circuit breaker system of claim 1, wherein said inductive charging panel is formed from a material chosen from a group of materials consisting of plastic, ceramic, epoxy, and carbon.

\* \* \* \* \*